United States Patent
Lin et al.

(10) Patent No.: US 9,727,338 B2
(45) Date of Patent: Aug. 8, 2017

(54) SYSTEM AND METHOD FOR TRANSLATING PROGRAM FUNCTIONS FOR CORRECT HANDLING OF LOCAL-SCOPE VARIABLES AND COMPUTING SYSTEM INCORPORATING THE SAME

(71) Applicant: Nvidia Corporation, Santa Clara, CA (US)

(72) Inventors: Yuan Lin, Santa Clara, CA (US); Gautam Chakrabarti, Santa Clara, CA (US); Jaydeep Marathe, Santa Clara, CA (US); Okwan Kwon, West Lafayette, IN (US); Amit Sabne, West Lafayette, IN (US)

(73) Assignee: Nvidia Corporation, Santa Clara, CA (US)

( * ) Notice: Subject to any disclaimer, the term of this patent is extended or adjusted under 35 U.S.C. 154(b) by 243 days.

(21) Appl. No.: 13/724,202

(22) Filed: Dec. 21, 2012

(65) Prior Publication Data

US 2014/0130021 A1     May 8, 2014

Related U.S. Application Data

(60) Provisional application No. 61/722,661, filed on Nov. 5, 2012.

(51) Int. Cl.
    *G06F 9/45*     (2006.01)
    *G06F 9/38*     (2006.01)
    (Continued)

(52) U.S. Cl.
    CPC ............... *G06F 9/38* (2013.01); *G06F 8/40* (2013.01); *G06F 9/30134* (2013.01);
    (Continued)

(58) Field of Classification Search
    CPC ....................................................... G06F 8/457
    (Continued)

(56) References Cited

U.S. PATENT DOCUMENTS 5,875,464 A     2/1999     Kirk
6,088,770 A     7/2000     Tarui et al.
(Continued)

FOREIGN PATENT DOCUMENTS

CN     1725176 A     1/2006
CN     101176066 A     5/2008
(Continued)

OTHER PUBLICATIONS

Reyes et al. ("accULL: An OpenACC Implementation with CUDA and OpenCL Support," 2012).*

(Continued)

*Primary Examiner* — Li B Zhen
*Assistant Examiner* — Lenin Paulino
(74) *Attorney, Agent, or Firm* — Kevin Brown; Parker Justiss, P.C.

(57) ABSTRACT

A system and method of translating functions of a program. In one embodiment, the system includes: (1) a local-scope variable identifier operable to identify local-scope variables employed in the at least some of the functions as being either thread-shared local-scope variables or thread-private local-scope variables and (2) a function translator associated with the local-scope variable identifier and operable to translate the at least some of the functions to cause thread-shared memory to be employed to store the thread-shared local-scope variables and thread-private memory to be employed to store the thread-private local-scope variables.

17 Claims, 4 Drawing Sheets

(51) Int. Cl.
*G06F 12/0853* (2016.01)
*G06F 9/30* (2006.01)
*G06F 12/02* (2006.01)
*G06F 9/52* (2006.01)
*G06F 9/50* (2006.01)

(52) U.S. Cl.
CPC .............. *G06F 9/5016* (2013.01); *G06F 9/52* (2013.01); *G06F 9/522* (2013.01); *G06F 12/02* (2013.01); *G06F 12/0853* (2013.01); *G06F 2212/451* (2013.01)

(58) Field of Classification Search
USPC ........................................................ 717/136
See application file for complete search history.

(56) References Cited

U.S. PATENT DOCUMENTS

| | | | |
|---|---|---|---|
| 6,609,193 | B1 | 8/2003 | Douglas et al. |
| 7,086,063 | B1 | 8/2006 | Ousterhout et al. |
| 7,856,541 | B2 | 12/2010 | Kaneda et al. |
| 8,250,555 | B1 | 8/2012 | Lee et al. |
| 8,335,892 | B1 | 12/2012 | Minkin et al. |
| 8,397,013 | B1 | 3/2013 | Rosenband et al. |
| 8,516,483 | B2 | 8/2013 | Chinya et al. |
| 8,547,385 | B2 | 10/2013 | Jiao |
| 8,615,646 | B2 | 12/2013 | Nickolls et al. |
| 8,683,132 | B1 | 3/2014 | Danilak |
| 2002/0029357 | A1 | 3/2002 | Charnell et al. |
| 2003/0018684 | A1 | 1/2003 | Ohaswa et al. |
| 2005/0125774 | A1* | 6/2005 | Barsness ............... G06F 8/4436 717/110 |
| 2006/0095675 | A1 | 5/2006 | Yang et al. |
| 2007/0136523 | A1 | 6/2007 | Bonella et al. |
| 2007/0143582 | A1 | 6/2007 | Coon et al. |
| 2007/0192541 | A1 | 8/2007 | Balasubramonian et al. |
| 2007/0294512 | A1 | 12/2007 | Crutchfield et al. |
| 2008/0052466 | A1 | 2/2008 | Zulauf |
| 2008/0109795 | A1* | 5/2008 | Buck ....................... G06F 8/443 717/137 |
| 2008/0126716 | A1 | 5/2008 | Daniels |
| 2008/0276262 | A1* | 11/2008 | Munshi ..................... G06F 8/41 719/328 |
| 2009/0006758 | A1 | 1/2009 | Chung et al. |
| 2009/0013323 | A1 | 1/2009 | May et al. |
| 2009/0031290 | A1* | 1/2009 | Feng ....................... G06F 8/456 717/126 |
| 2009/0100244 | A1 | 4/2009 | Chang et al. |
| 2010/0079454 | A1 | 4/2010 | Legakis et al. |
| 2010/0281230 | A1 | 11/2010 | Rabii et al. |
| 2011/0022672 | A1* | 1/2011 | Chang ..................... G06Q 10/08 709/206 |
| 2011/0072214 | A1 | 3/2011 | Li et al. |
| 2011/0072438 | A1 | 3/2011 | Fiyak et al. |
| 2011/0125974 | A1 | 5/2011 | Anderson |
| 2011/0191522 | A1 | 8/2011 | Condict et al. |
| 2011/0265068 | A1 | 10/2011 | Elnozahy et al. |
| 2011/0320804 | A1 | 12/2011 | Chan et al. |
| 2012/0072652 | A1 | 3/2012 | Celis et al. |
| 2012/0089792 | A1 | 4/2012 | Fahs et al. |
| 2012/0131309 | A1* | 5/2012 | Johnson .................... G06F 9/30 712/41 |
| 2012/0137055 | A1 | 5/2012 | Lee et al. |
| 2012/0137099 | A1 | 5/2012 | Shibayama et al. |
| 2012/0151179 | A1 | 6/2012 | Gaertner et al. |
| 2012/0191953 | A1 | 7/2012 | Eichenberger et al. |
| 2012/0204065 | A1 | 8/2012 | Tsafrir et al. |
| 2012/0254530 | A1 | 10/2012 | Tagaya |
| 2013/0263153 | A1* | 10/2013 | Gschwind ........... G06F 9/44521 719/313 |
| 2014/0007114 | A1* | 1/2014 | Wang ..................... G06F 9/5027 718/102 |
| 2014/0129783 | A1 | 5/2014 | Marathe et al. |
| 2014/0129812 | A1 | 5/2014 | Chakrabarti et al. |
| 2014/0130052 | A1 | 5/2014 | Lin et al. |

FOREIGN PATENT DOCUMENTS

| | | |
|---|---|---|
| CN | 101819675 A | 9/2010 |
| TW | 201140447 A | 11/2011 |
| TW | 201220246 A | 5/2012 |

OTHER PUBLICATIONS

Chen, Dehao, et al., "Tree Partition based Parallel Frequent Pattern Mining on Shared Memory Systems", IEEE, Apr. 25, 2066, 8 pages.

Thomas, McCarthy, et al., "The Very Basics of Garbage Collection," Aug. 26, 2008, 4 pages.

Steffen, Michael, et al., "Improving SIMT Efficiency of Global Rendering Algorithms with Architectural Support for Dynamic Micro-Kernels", 2010, 43rd Annual IEEE/ACM International Symposium on Microarchitecture, 12 pages.

Meng, Jiayuan, et al., "Dynamic Warp Subdivision for Integrated Branch and Memory Divergence Tolerance", Jun. 2010, 12 pages.

* cited by examiner

SYSTEM AND METHOD FOR TRANSLATING PROGRAM FUNCTIONS FOR CORRECT HANDLING OF LOCAL-SCOPE VARIABLES AND COMPUTING SYSTEM INCORPORATING THE SAME

CROSS-REFERENCE TO RELATED APPLICATION

This application claims the benefit of U.S. Provisional Application Ser. No. 61/722,661, filed by Lin, et al., on Nov. 5, 2012, entitled "Executing Sequential Code Using a Group of Threads," commonly assigned with this application and incorporated herein by reference.

TECHNICAL FIELD

This application is directed, in general, to computing systems and, more specifically, to a system and method for translating program functions for correct handling of local-scope variables and a computing system incorporating the same.

BACKGROUND

As those skilled in the art are familiar, software programs make use of variables, for which storage space must be allocated in memory. Often the storage space is allocated in the form of a stack.

Some programs organize their variables into levels to simplify their data structure. For example, some variables, known as local-scope variables, may be used only in one function (function-scope) or one block of statements (block-scope) in the program. Other variables, known as global-scope variables, may be used by the entire program. For example, Table 1, below, sets forth pseudocode illustrating two levels of local-scope variables: an array a[ ] being a function-scope variable, and array b[ ] being a block-scope variable.

TABLE 1

An Example of Function-Scope and Block-Scope Variables

```
void foo( ) {
    int a[100];
        if (...)
            int b[100];
            ...
        }
}
```

For purposes of understanding Table 1 and the remainder of this disclosure, the terms "foo" and "bar" are arbitrary names of functions. Any function can therefore be substituted for "foo" or "bar."

Some programs are parallel programs, in that they are capable of being executed in parallel in a parallel processor, such as a graphics processing unit (GPU). Parallel programs have sequential regions of code that cannot be executed in parallel and parallel regions of code that can be executed in parallel, in threads. In parallel programs, multiple threads need to gain access to some local-scope variables as defined by the programming model according to which the program was developed. OpenMP and OpenACC are two examples of conventional programming models for developing parallel programs. Tables 2 and 3, below, set forth pseudocode illustrating respective OpenMP and OpenACC examples.

TABLE 2

An OpenMP Example

```
void foo( ) {
    int a[100];
    #pragma omp parallel shared(a)
    {
        // a[ ] can be accessed by all threads in the OpenMP region.
    }
}
```

TABLE 3

An OpenACC Example

```
void foo( ) {
    int a[100];
    #pragma acc loop worker
    {
        // a[ ] can be accessed by all workers in the gang
    }
}
```

SUMMARY

One aspect provides a system for translating functions of a program. In one embodiment, the system includes: (1) a local-scope variable identifier operable to identify local-scope variables employed in the at least some of the functions as being either thread-shared local-scope variables or thread-private local-scope variables and (2) a function translator associated with the local-scope variable identifier and operable to translate the at least some of the functions to cause thread-shared memory to be employed to store the thread-shared local-scope variables and thread-private memory to be employed to store the thread-private local-scope variables.

Another aspect provides a method of translating functions of a program. In one embodiment, the method includes: (1) identifying at least some of the functions as either being executed during sequential regions of the program or being executed during parallel regions of the program, (2) identifying local-scope variables employed in the at least some of the functions as being either thread-shared local-scope variables or thread-private local-scope variables and (3) allocating thread-private memory for storage of the thread-private local-scope variables and thread-shared local-scope variables employed in functions executed during the parallel regions of the program, and thread-shared memory for storage of thread-shared local-scope variables employed in functions executed during the sequential regions of the program.

In another embodiment, the method includes: (1) creating corresponding shared clones and private clones of at least some of the functions and (2) invoking the shared clones in lieu of the corresponding functions during execution of sequential regions of the program and the private clones in lieu of the corresponding functions during execution of parallel regions of the program.

BRIEF DESCRIPTION

Reference is now made to the following descriptions taken in conjunction with the accompanying drawings, in which.

DETAILED DESCRIPTION

Figure 1:
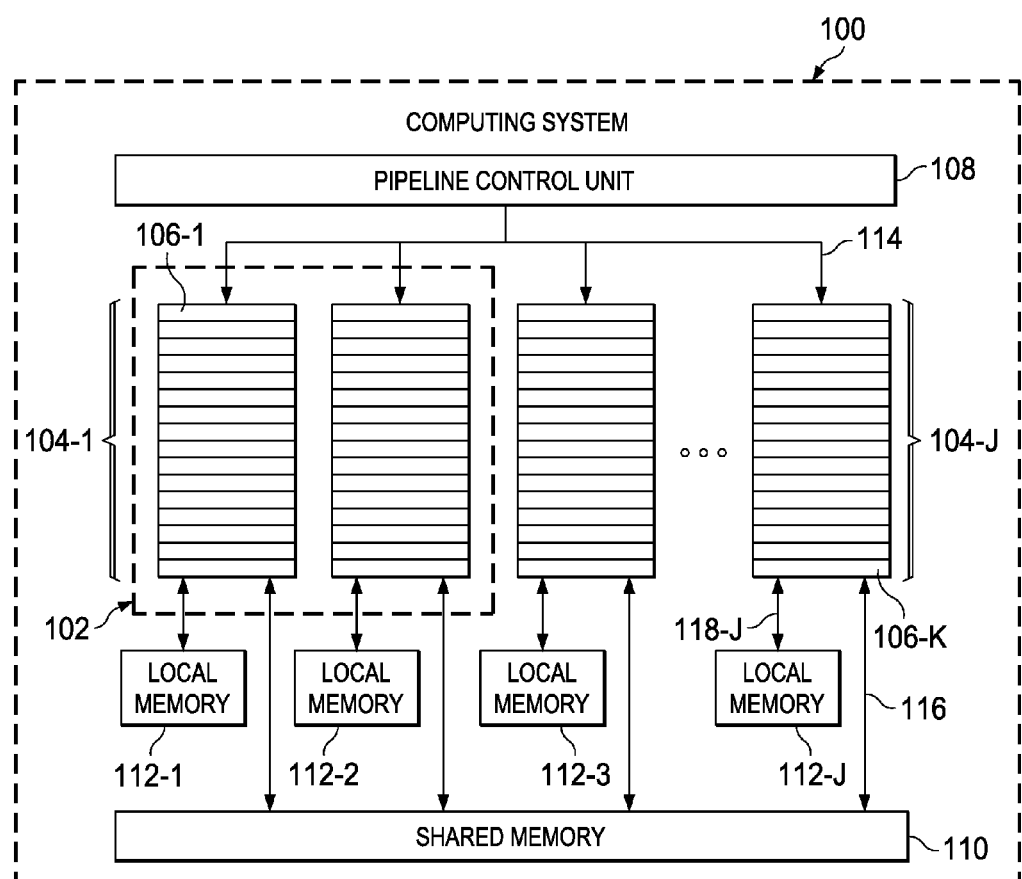
FIG. 1 is a block diagram of a computing system capable of parallel processing and operable to contain or carry out a system and method for translating functions for correct handling of local-scope variables.

Some computer architectures, including those centered about general-purpose central processing units (CPUs), typically provide a memory structure that is, by default, shared over the entirety of a given program such that all blocks, and all functions in the blocks, in the program have access to all of the variables. Allocating storage space in such architectures is straightforward; it is allocated in the shared memory structure.

However, certain computing systems, such as GPUs, employ a stratified memory architecture in which some memory is thread-private (accessible only by a given thread), and other memory is thread-shared (accessible by multiple threads, e.g., in a given block or the entirety of a program).

It is realized that the local-scope variables defined in some programs are exclusively used in one thread, but that others need to be shared between threads. It is further realized, however, that programs in many programming models (OpenMP or OpenACC for example) do not draw a distinction between thread-private and thread-shared local-scope variables.

A conservative, but trivial approach to a solution might be to allocate storage space in the thread-shared memory for all of the local-scope variables. However, it is realized herein that the thread-shared memory is often too small to contain all local-scope variables. An alternative approach might be to allocate storage space in the thread-private memory for all of the local-scope variables. However, the local-scope variables could not then be shared in a straightforward manner between threads. Instead, local-scope variables would have to be copied between thread-private memories to effect sharing, which is clumsy and slows program execution. Yet another approach might be to rewrite the program body to incorporate called functions into the functions calling them, a technique called inlining. However, this obscures the program's structure, making it difficult to understand and modify. Still another approach might be to analyze the program manually, designating local-scope variables for storage in either thread-private or thread-shared memory by hand. However, this approach is labor-intensive and error-prone.

It is realized herein that an automated mechanism is needed for translating the functions of a program such that local-scope variables requiring thread-shared memory (thread-shared local-scope variables) are identified. Once identified, the local-scope variables may then be handled correctly. More particularly, storage space in thread-shared memory can be allocated for the thread-shared local-scope variables, and storage space in thread-local memory can be allocated for the local-scope variables not requiring shared memory (thread-private local-scope variables).

Accordingly, introduced herein are various embodiments of a system and method for translating functions for correct handling of local-scope variables in thread-shared and private contexts. In general, the system and method embodiments identify local-scope variables as being either thread-shared local-scope variables or thread-private local-scope variables and allocate thread-private or thread-shared memory to store the local-scope variables based on their identification and the region in which the function employing them is being executed: either in a sequential region or a parallel region.

Before describing various embodiments of the novel system and method in greater detail, a representative computing system will now be described.

FIG. 1 is a block diagram of a computing system 100 within which one or more aspects of the invention may be implemented. Computing system 100 includes multiple thread processors, or cores 106, organized into thread groups 104, or "warps." Computing system 100 contains J thread groups 104-1 through 104-J, each having K cores 106-1 through 106-K. In certain embodiments, thread groups 104-1 through 104-J may be further organized into one or more thread blocks 102. One specific embodiment has thirty-two cores 106 per thread group 104. Other embodiments may include as few as four cores in a thread group and as many as several tens of thousands. Certain embodiments organize cores 106 into a single thread group 104, while other embodiments may have hundreds or even thousands of thread groups 104. Alternate embodiments of computing system 100 may organize cores 106 into thread groups 104 only, omitting the thread block organization level.

Computing system 100 further includes a pipeline control unit 108, shared memory 110 and an array of local memory 112-1 through 112-J associated with thread groups 104-1 through 104-J. Pipeline control unit 108 distributes tasks to the various thread groups 104-1 through 104-J over a data bus 114. Pipeline control unit 108 creates, manages, schedules, executes and provides a mechanism to synchronize thread groups 104-1 through 104-J.

Cores 106 within a thread group execute in parallel with each other. Thread groups 104-1 through 104-J communicate with shared memory 110 over a memory bus 116. Thread groups 104-1 through 104-J respectively communicate with local memory 112-1 through 112-J over local buses 118-1 through 118-J. For example, a thread group 104-J utilizes local memory 112-J by communicating over a local bus 118-J. Certain embodiments of computing system 100 allocate a shared portion of shared memory 110 to each thread block 102 and allow access to shared portions of shared memory 110 by all thread groups 104 within a thread block 102. Certain embodiments include thread groups 104 that use only local memory 112. Many other embodiments include thread groups 104 that balance use of local memory 112 and shared memory 110.

The embodiment of FIG. 1 includes a master thread group 104-1. Each of the remaining thread groups 104-2 through 104-J are considered "worker" thread groups. The master thread group 104-1 includes numerous cores, one of which is a master core 106-1, which ultimately executes a master thread. Programs executed on computing system 100 are structured as a sequence of kernels. Typically, each kernel completes execution before the next kernel begins. In certain embodiments, computing system 100 may execute multiple kernels in parallel, depending on the size of the kernels. Each kernel is organized as a hierarchy of threads to be executed on the cores 106.

Having described a representative computing system, various embodiments of the novel system and method for translating functions for correct handling of local-scope variables in thread-shared and private contexts will now be described in greater detail.

Figure 2:
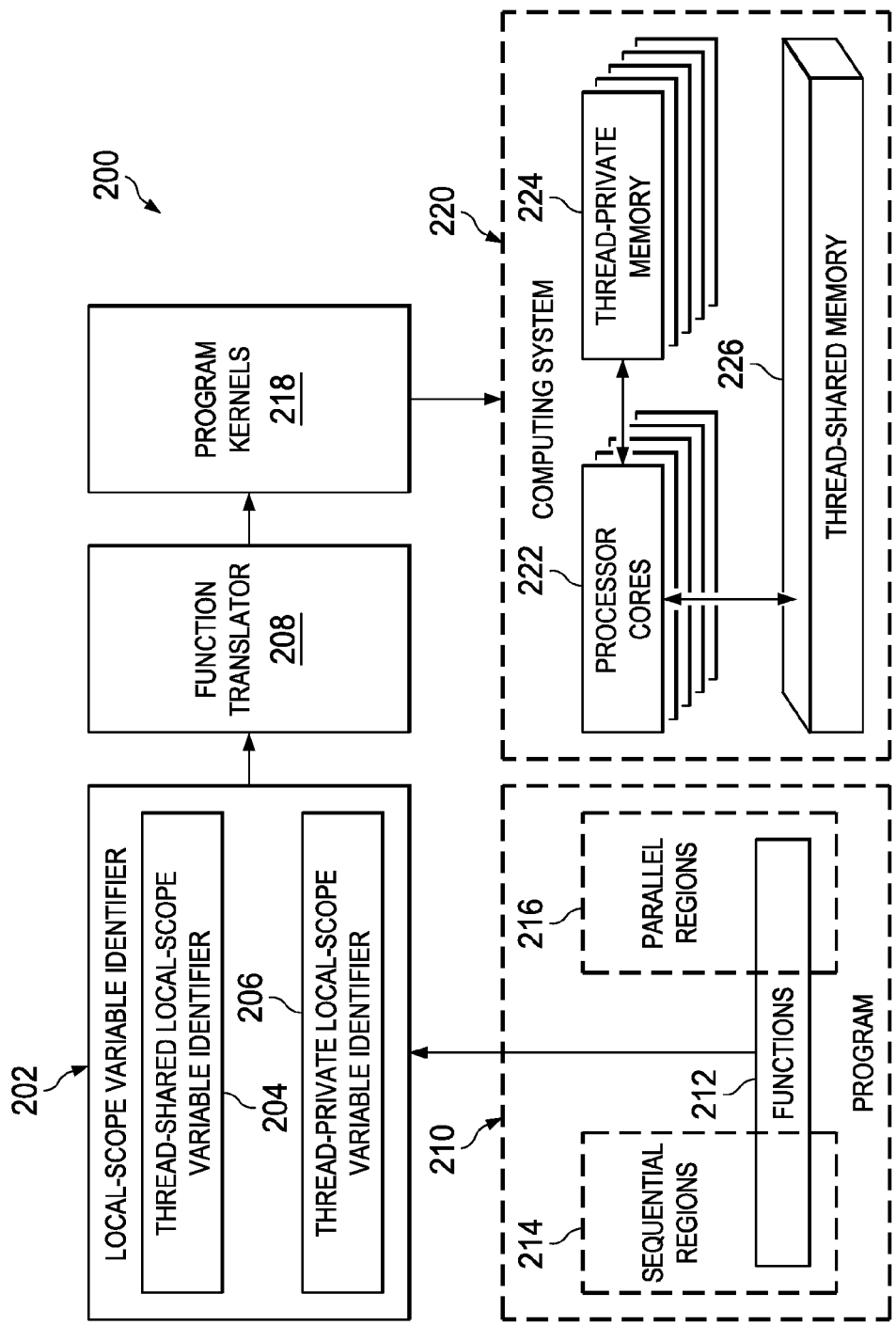
FIG. 2 is a block diagram of one embodiment of a system for translating functions for correct handling of local-scope variables.

FIG. 2 is a block diagram of one embodiment of a system 200 for translating functions for correct handling of local-scope variables. System 200 includes a local-scope variable identifier 202 and a function translator 208. Functions 212 of a program 210 are processed by local-scope variable identifier 202 and function translator 208 to produce program kernels 218 that are executable on a computing system 220. Computing system 220 includes processor cores 222, thread-private memory 224 and thread shared memory 226. All processor cores 222 may gain access to thread-shared memory 226. Each of processor cores 222 may gain access to its associated block of thread-private memory 224.

Program 210 may be apportioned into sequential regions 214 and parallel regions 216. Functions 212 within program 210 may be executed from either of the sequential regions 214 and parallel regions 216, and are often executed from both at various points in the sequence of program 210. Functions 212 employ variables that are of either global-scope or local-scope with respect to a particular function of functions 212. Of the local-scope variables within the particular function, there are thread-shared and thread-private variables. Thread-shared local-scope variables are accessible by all parallel threads within program kernels 218 and executing on computing system 220. Thread-private local-scope variables are accessible only by the thread for which the variables are instantiated.

Local-scope variable identifier 202 includes a thread-shared local-scope variable identifier 204 and a thread-private local-scope variable identifier 206. Thread-shared local-scope variable identifier 204 operates on a single function of functions 212 by determining (1) whether the single function contains a parallel construct within which access to a local-scope variable can be had by different threads within the parallel construct, or (2) whether a local-scope variable within the single function escapes to other threads of execution (under escape analysis). If either of these conditions is true, the local-scope variable is a thread-shared local-scope variable. Otherwise, thread-private local-scope variable identifier 206 identifies the local-scope variable as thread-private local-scope.

Function translator 208 operates on the single function of functions 212 by generating directives in program kernels 218 as to how memory should be allocated for each local-scope variable in the single function. For thread-shared local-scope variables, blocks of thread-shared memory 226 are allocated. For thread-private local-scope variables, blocks of thread-private memory 224 are allocated. When program kernels 218 are executed on processor cores 222 within computing system 220, i.e., at run-time, the process of allocating memory for variables begins according to the directives generated by function translator 208.

Realized herein are two methods of translating a function such that local-scope variables are selectively allocated thread-shared memory or thread-private memory. The methods realized herein do not require "inlining" all function calls or a whole-program analysis. The methods realized herein are general and support separate compilation and linking, which is one foundation of building large modular software.

The two methods disclosed herein take advantage of two characteristics of parallel programming models (e.g., OpenMP and OpenACC). The first is that not all local-scope variables need to be shared. The methods realized herein recognize this fact and identify the necessarily thread-shared local-scope variables. The second characteristic is that when a function is called within a parallel region of a program, a thread cannot gain access to the local-scope variables of other threads. The methods realized herein recognize local-scope variables need not be shared when instantiated within a function called within the parallel region of the program.

One specific embodiment of the first of the two methods disclosed herein includes the following procedures:

1. A block of thread-shared memory is pre-allocated for a shared stack. A block of thread-private memory is pre-allocated for a private stack associated with each thread.

2. Thread-shared local-scope variables and thread-private local-scope variables within a function are identified as follows:
    a. If the function contains a parallel construct and access to a local-scope variable can be had by different threads within the parallel construct according to the programming model, then the local-scope variable is identified as a thread-shared local-scope variable.
    b. If a local-scope variable escapes, then the variable is identified as a thread-shared local-scope variable.
    c. All other local-scope variables are identified as thread-private local-scope variables.

3. A function foo( ) is cloned into two extra functions: a shared clone foo_shared( ) and a private clone foo_private( ).
    a. In foo_shared( )
    i. The thread-shared local-scope variables identified in procedure 2 are allocated in the thread-shared memory. The thread-private local-scope variables identified in procedure 2 are allocated in the thread-private memory.
    ii. If foo( ) contains a direct call to another function bar( ) and bar( ) is called within a parallel construct, then the call to bar( ) is translated into a call to bar_private( ) in foo_shared( ). If bar( ) is called outside a parallel construct, then the call to bar( ) is translated into a call to bar_shared( ) in foo_shared( )
    iii. If foo( ) does not contain any parallel region, then a direct call to another function bar( ) is translated into a call to bar_shared( ) in foo_shared( ).
    b. In foo_private( )
    i. All local-scope variables (regardless of what they are identified as in procedure 2) are allocated in the thread-private memory.
    ii. A call to another function bar( ) is translated into a call to its private clone bar_private( ) because, a private clone will only be called from within a parallel region.

4. The original function foo( ) is translated into the following form:

TABLE 4

| Translated Function |
| --- |
| return_type foo(arguments) {<br>    if (in_parallel_flag == false)<br>        return foo_shared(arguments);<br>    else<br>        return foo_private(arguments);<br>} | where "in_parallel_flag" is a per thread flag described in procedure 6 below. When addressing the function, the address of the translated form is used.

5. After procedures 3 and 4, only private clones are called directly within any parallel region. Only shared clones are called directly outside any parallel region. Indirect calls are made to the transformed version from procedure 4. Only thread-shared or potentially thread-shared local-scope variables are put in thread-shared memory.

6. A per-thread flag is used to mark the state of a thread. The value of the flag is either "true" or "false." When a thread enters a parallel region, the flag is set to "true." When the thread leaves a parallel region, the flag is set to "false."

Figure 3:
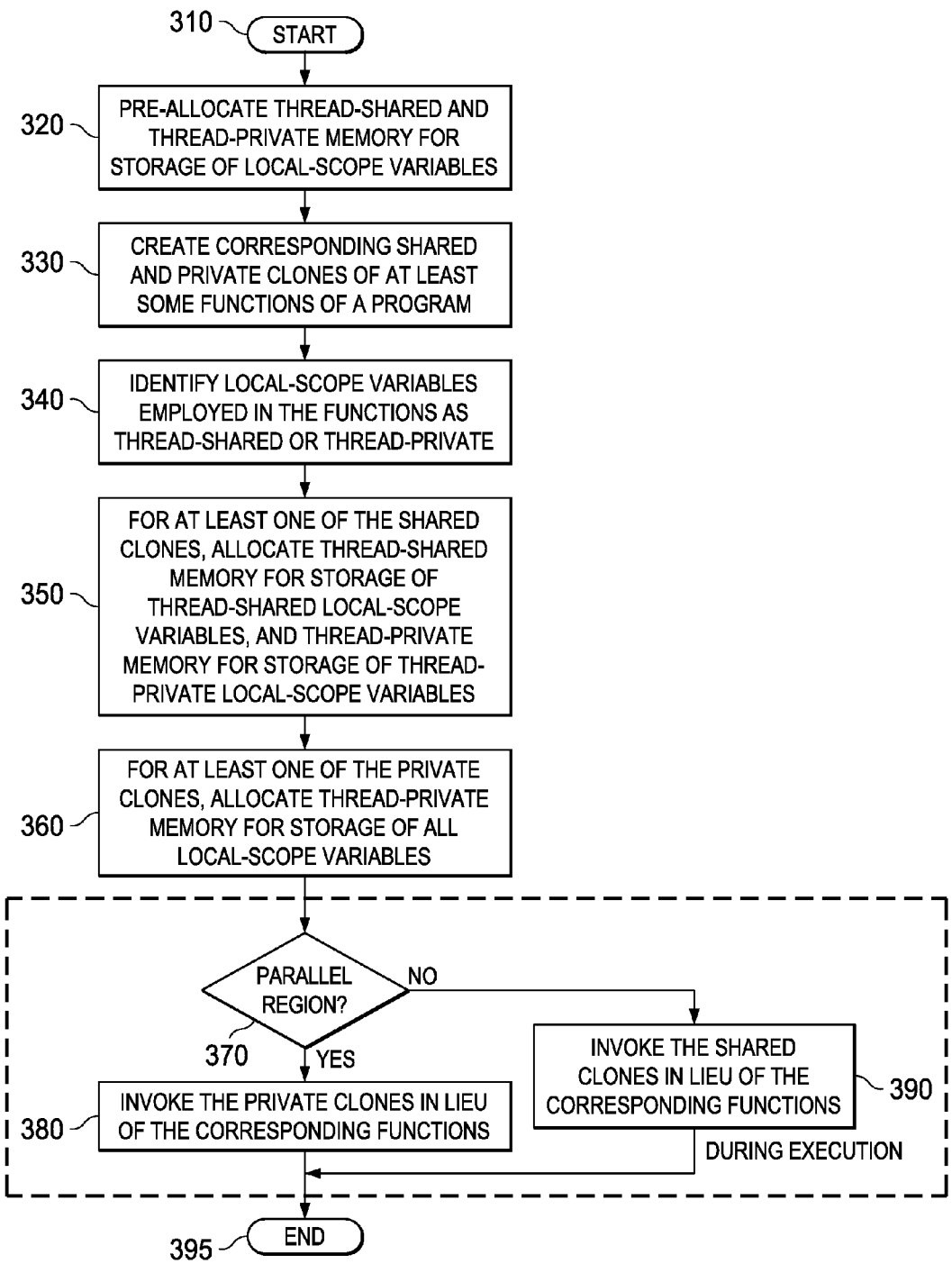
FIG. 3 is a flow diagram of one embodiment of a method of translating a function for correct handling of local-scope variables.

FIG. 3 is a flow diagram of one embodiment of a method of translating a function for correct handling of local-scope variables. The method begins in a start step 310. In a step 320, thread-shared memory and thread-private memory are pre-allocated for storage of local-scope variables. In one embodiment, the thread-shared memory is block-scope memory.

In a step 330, corresponding shared clones and private clones of at least some of the functions are created. In a step 340, local-scope variables employed in the functions are identified as being either thread-shared local-scope variables or thread-private local-scope variables. In a step 350, for at least one of the shared clones, thread-shared memory is allocated for storage of thread-shared local-scope variables and thread-private memory for storage of the thread-private local-scope variables. In a step 360, for at least one of the private clones, thread-private memory is allocated for storage of all local-scope variables. In a decisional step 370, it is determined whether or not a parallel region of the program is being executed. If so, in a step 380, the private clones are invoked in lieu of the corresponding functions during execution. If not, in a step 390, the shared clones are invoked in lieu of the corresponding functions.

In one embodiment, the invoking of the steps 380, 390 is effected by: (1) in the at least one of the shared clones, translating a call of a function: (1a) made in a parallel construct into a call of a private clone of the function and (1b) made in a sequential construct into a call of a shared clone of the function and (2) in the at least one of the private clones, translating a call of a function into a call of a private clone of the function. In a related embodiment, the invoking of the steps 380, 390 is effected by employing addresses of at least some of the functions in executing the program. In another related embodiment, the invoking of the steps 380, 390 is effected by translating the at least some of the functions to cause the invoking to be carried out. In a related embodiment, the allocating includes employing a flag having a first state during the execution of the sequential regions and a second state during the execution of the parallel regions. The method ends in an end step 395.

One specific embodiment of the second of the two methods disclosed herein includes the following procedures:

1. A block of thread-shared memory is pre-allocated for a shared stack. A block of thread-private memory is pre-allocated for a private stack associated with each thread.

2. Thread-shared local-scope variables and thread-private local-scope variables within a function are identified as follows:
   a. If the function contains a parallel construct and access to a local-scope variable can be had by different threads within the parallel construct according to the programming model, then the local-scope variable is identified as a thread-shared local-scope variable.
   b. If a local-scope variable escapes, then the variable is identified as a thread-shared local-scope variable.
   c. All other local-scope variables are identified as thread-private local-scope variables.

3. In a function foo( ) all thread-private local-scope variables identified in procedure 2 are allocated in the thread-private memory. Each of the thread-shared local-scope variables identified in procedure 2 is allocated conditionally based on whether the function is called within a serial and a parallel context.

TABLE 5

Translated Function

```
return_type foo(arguments) {
    if (in_parallel_flag == false)
        allocate thread-shared local-scope variables on
        shared stack;
    else
        allocate thread-shared local-scope variables on
        private stack;
    allocate private local-scope variables on private
    stack;
        <function-body>
}
```

4. A per-thread flag is used to mark the state of a thread. The value of the flag is either "true" or "false." When a thread enters a parallel region, the flag is set to "true." When the thread leaves a parallel region, the flag is set to "false."

Figure 4:
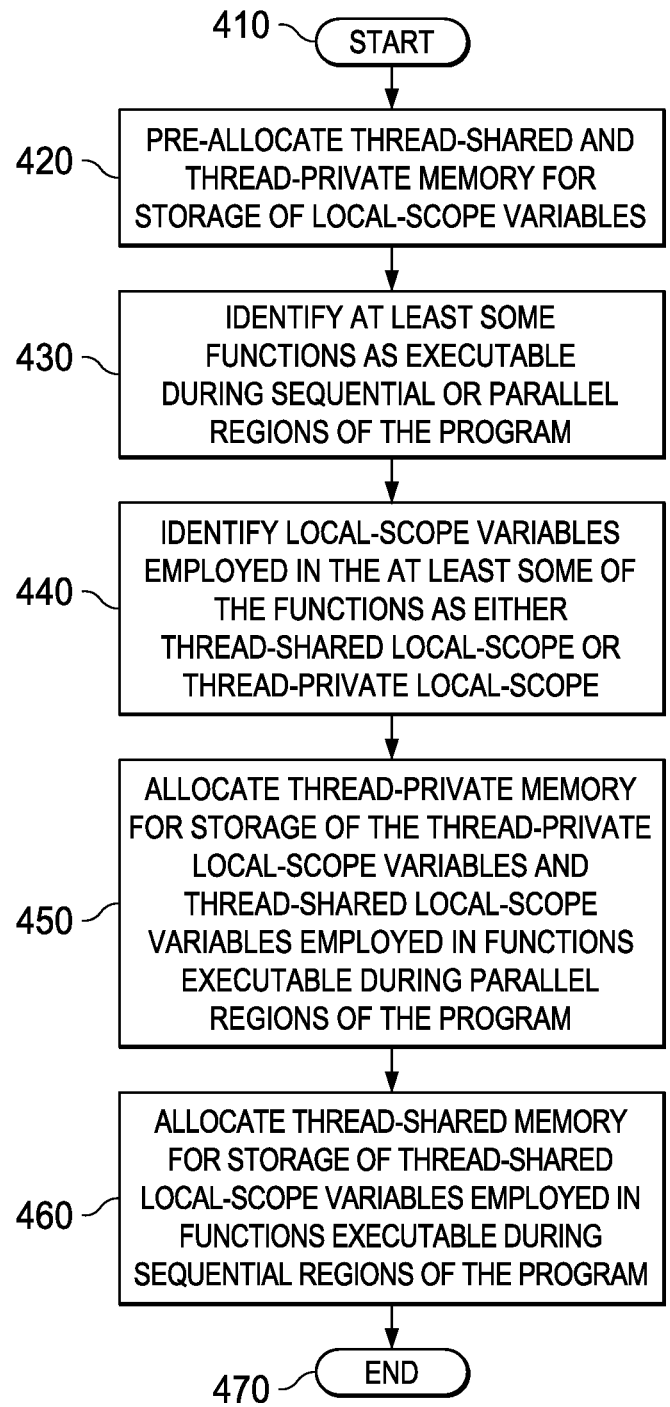
FIG. 4 is a flow diagram of another embodiment of a method of translating a function for correct handling of local-scope variables.

FIG. 4 is a flow diagram of another embodiment of a method of translating a function for correct handling of local-scope variables. The method begins in a start step 410. In a step 420, thread-shared memory and thread-private memory are pre-allocated for storage of local-scope variables. In one embodiment, the thread-shared memory is block-scope memory.

In a step 430, at least some of the functions are identified as either being executed during sequential regions of the program or being executed during parallel regions of the program. In a step 440, local-scope variables employed in the at least some of the functions are identified as being either thread-shared local-scope variables or thread-private local-scope variables. In one embodiment, the identifying of the local-scope variables includes identifying a local-scope variable as a thread-shared local-scope variable if a function contains a parallel construct and multiple threads can gain access to the local-scope variable within the parallel construct according to a programming model or the local-scope variable escapes the function and identifying remaining local-scope variables as thread-private local-scope variables.

In a step 450, the thread-private memory is allocated for storage of the thread-private local-scope variables and thread-shared local-scope variables employed in functions executed during the parallel regions of the program. In a step 460, the thread-shared memory is allocated for storage of thread-shared local-scope variables employed in functions executed during the sequential regions of the program. In one embodiment, at least some of the functions are translated to cause the allocating to be carried out. In a related embodiment, the allocating includes employing a flag having a first state during the execution of the sequential regions and a second state during the execution of the parallel regions. The method ends in an end step 470.

Those skilled in the art to which this application relates will appreciate that other and further additions, deletions, substitutions and modifications may be made to the described embodiments.

What is claimed is:

1. A graphics processing unit (GPU) for translating functions of a program, comprising:
multiple thread processors;
a thread-shared memory coupled to said multiple thread processors of said GPU;

a thread-private memory coupled to said multiple thread processors of said GPU;

a local-scope variable identifier of said GPU operable to identify local-scope variables employed in at least some of said functions as being either thread-shared local-scope variables or thread-private local-scope variables, wherein said local-scope variable identifier comprises:

a thread-shared local-scope variable identifier operable to identify a local-scope variable as a thread-shared local-scope variable if a function contains a parallel construct and multiple threads can gain access to said local-scope variable within said parallel construct according to a programming model or said local-scope variable escapes said function; and a thread-private local-scope variable identifier associated with said thread-shared local-scope variable identifier and operable to identify remaining local-scope variables as thread-private local-scope variables; and a function translator of said GPU associated with said local-scope variable identifier and operable to translate said at least some of said functions to cause said thread-shared memory to be employed to store said thread-shared local-scope variables and said thread-private memory to be employed to store said thread-private local-scope variables.

2. The GPU as recited in claim 1 wherein said programming model is selected from the group consisting of:
an OpenMP programming model, and
an OpenACC programming model.

3. The GPU as recited in claim 1 wherein said function translator is further operable to employ a flag having a first state during said execution of sequential regions of said program and a second state during execution of parallel regions of said program.

4. The GPU as recited in claim 1 wherein said thread-shared memory is block-scope memory.

5. The GPU as recited in claim 1 further comprising a memory pre-allocator configured to pre-allocate said thread-shared memory and thread-private memory.

6. A non-transitory computer readable medium containing program code which, when executed by a processor of a computer, causes said processor to perform a method of translating functions of a program, said method comprising the steps of:

creating both corresponding shared clones and private clones at a same time of at least some of said functions;

invoking said shared clones in lieu of said corresponding functions during execution of sequential regions of said program and said private clones in lieu of said corresponding functions during execution of parallel regions of said program;

identifying local-scope variables employed in said functions as being either:
thread-shared local-scope variables if a function contains a parallel construct and multiple threads can gain access to said local-scope variable within said parallel construct according to a programming model or said local-scope variable escapes said function, or thread-private local-scope variables;

for at least one of said shared clones, allocating thread-shared memory for storage of thread-shared local-scope variables and thread-private memory for storage of said thread-private local-scope variables; and for at least one of said private clones, allocating thread-private memory for storage of all local-scope variables.

7. The method as recited in claim 6 further comprising pre-allocating said thread-shared memory and said thread-private memory.

8. The method as recited in claim 6 wherein said invoking comprises:

in said at least one of said shared clones, translating a call of a function:
made in a parallel construct into a call of a private clone of said function, and
made in a sequential construct into a call of a shared clone of said function; and in said at least one of said private clones, translating a call of a function into a call of a private clone of said function.

9. The method as recited in claim 6 further comprising employing addresses of at least some of said functions in executing said program.

10. The method as recited in claim 6 further comprising translating said at least some of said functions to cause said invoking to be carried out.

11. The method as recited in claim 6 wherein said invoking comprises employing a flag having a first state during said execution of said sequential regions and a second state during said execution of said parallel regions.

12. The method as recited in claim 6 wherein said thread-shared memory is block-scope memory.

13. A method of translating functions of a program, comprising:

identifying, by a graphics processing unit (GPU), at least some of said functions as either being executed during sequential regions of said program or being executed during parallel regions of said program, said program consisting of code to be executed on at least some of multiple thread processors;

identifying, by said GPU, local-scope variables employed in said at least some of said functions as being either:
thread-shared local-scope variables if a function contains a parallel construct and multiple threads can gain access to said local-scope variable within said parallel construct according to a programming model or said local-scope variable escapes said function, or thread-private local-scope variables; and allocating, by said GPU, thread-private memory for storage of said thread-private local-scope variables and thread-shared local-scope variables employed in functions executed during said parallel regions of said program, and thread-shared memory for storage of thread-shared local-scope variables employed in functions executed during said sequential regions of said program, each of said thread-private memory and said thread-shared memory coupled to said multiple thread processors.

14. The method as recited in claim 13 further comprising translating said at least some of said functions to cause said allocating to be carried out.

15. The method as recited in claim 13 wherein said allocating comprises employing a flag having a first state during said execution of said sequential regions and a second state during said execution of said parallel regions.

16. The method as recited in claim 13 wherein said thread-shared memory is block-scope memory.

17. The method as recited in claim 13 further comprising pre-allocating said thread-shared memory and said thread-private memory.

* * * * *